(12) United States Patent
Leister

(10) Patent No.: US 9,581,963 B2
(45) Date of Patent: Feb. 28, 2017

(54) METHOD FOR ENCODING A HOLOGRAM IN A LIGHT MODULATION DEVICE

(71) Applicant: SEEREAL TECHNOLOGIES S.A., Munsbach (LU)

(72) Inventor: Norbert Leister, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 317 days.

(21) Appl. No.: 14/361,739

(22) PCT Filed: Nov. 29, 2012

(86) PCT No.: PCT/EP2012/074008
§ 371 (c)(1),
(2) Date: May 30, 2014

(87) PCT Pub. No.: WO2013/079622
PCT Pub. Date: Jun. 6, 2013

(65) Prior Publication Data
US 2015/0124302 A1 May 7, 2015

(30) Foreign Application Priority Data

Dec. 1, 2011 (DE) .......................... 10 2011 055 944
Dec. 2, 2011 (DE) .......................... 10 2011 056 006

(51) Int. Cl.
G03H 1/08 (2006.01)
G03H 1/22 (2006.01)
G02B 27/42 (2006.01)

(52) U.S. Cl.
CPC ....... *G03H 1/0841* (2013.01); *G02B 27/4205* (2013.01); *G02B 27/4266* (2013.01);
(Continued)

(58) Field of Classification Search
CPC ............ G02B 27/4205; G02B 27/4233; G02B 27/425; G02B 27/4266;
(Continued)

(56) References Cited

U.S. PATENT DOCUMENTS

| 2002/0060831 A1* | 5/2002 | Gerchberg | ............. G02B 27/46 |
| | | | 359/237 |
| 2003/0202634 A1* | 10/2003 | Gerchberg | ............. G02B 27/46 |
| | | | 378/147 |

(Continued)

FOREIGN PATENT DOCUMENTS

| DE | 10 2004 063 838 A1 | 7/2006 |
| WO | 2004/031841 A2 | 4/2004 |
| WO | 2004/044659 A2 | 5/2004 |

OTHER PUBLICATIONS

International Search Report, dated Mar. 1, 2013, and Written Opinion, issued in International Application No. PCT/EP2012/074008.

(Continued)

*Primary Examiner* — Derek S Chapel
(74) *Attorney, Agent, or Firm* — Saul Ewing LLP

(57) ABSTRACT

A hologram is constructed from individual subholograms assigned to corresponding encoding regions in a light modulation device and respectively assigned to an object point of the object to be reconstructed with the hologram. With a virtual observer window, a defined viewing region is provided through which a reconstructed scene in a reconstruction space is observed by an observer. A complex value of a wavefront for each individual object point is calculated in the virtual observer window. Each individual amplitude of a complex value of a wavefront in the virtual observer window is subsequently multiplied by a correction value with which a correction of the angle selectivity of at least one volume grating arranged downstream in the beam path of the (Continued)

light modulation device is carried out. The corrected complex values determined in this way for all object points are summed and transformed into the hologram plane of the light modulation device.

18 Claims, 7 Drawing Sheets

(52) U.S. Cl.
CPC ......... *G03H 1/0808* (2013.01); *G03H 1/2205* (2013.01); *G03H 1/2294* (2013.01); *G02B 27/4272* (2013.01); *G03H 2001/0816* (2013.01); *G03H 2001/0825* (2013.01); *G03H 2223/23* (2013.01)

(58) Field of Classification Search
CPC .. G02B 27/4272–27/4277; G03H 1/08; G03H 1/0808; G03H 1/0841; G03H 1/0866; G03H 1/0891; G03H 1/22–1/2205; G03H 1/2294; G03H 2011/0816; G03H 2011/0825; G03H 2011/0833; G03H 2011/0858; G03H 2011/0883; G03H 2011/2223; G03H 2011/2236; G03H 2011/2239; G03H 2223/23; G03H 2225/00; G03H 2225/12; G03H 2225/13; G03H 2225/22; G03H 2225/25; G03H 2225/30–2225/34; G03H 2225/55

USPC .................................................. 359/1, 9, 21
See application file for complete search history.

(56) References Cited

U.S. PATENT DOCUMENTS

| | | | |
|---|---|---|---|
| 2010/0194854 A1* | 8/2010 | Kroll | G02B 26/005 348/40 |
| 2011/0019249 A1 | 1/2011 | Leister | |
| 2011/0248963 A1* | 10/2011 | Lawrence | G03H 1/0005 345/175 |
| 2011/0251905 A1* | 10/2011 | Lawrence | G03H 1/0005 705/15 |

OTHER PUBLICATIONS

Kampfe et al., "Designing multilane computer-generated holograms with consideration of the pixel shape and the illumination wave," J. of the Optical Society of America, Bd. 25, No. 7, pp. 1609-1622 (Jul. 1, 2008) XP007908642.

Mostafa Agour et al., "Digital pre-filtering approach to improve optically reconstructed wavefields in opto-electronic holography," J. Optics, Institute of Physics Publishing, Bd. 12, No. 5, pp. 55401 (May 1, 2010) XP020178818.

* cited by examiner

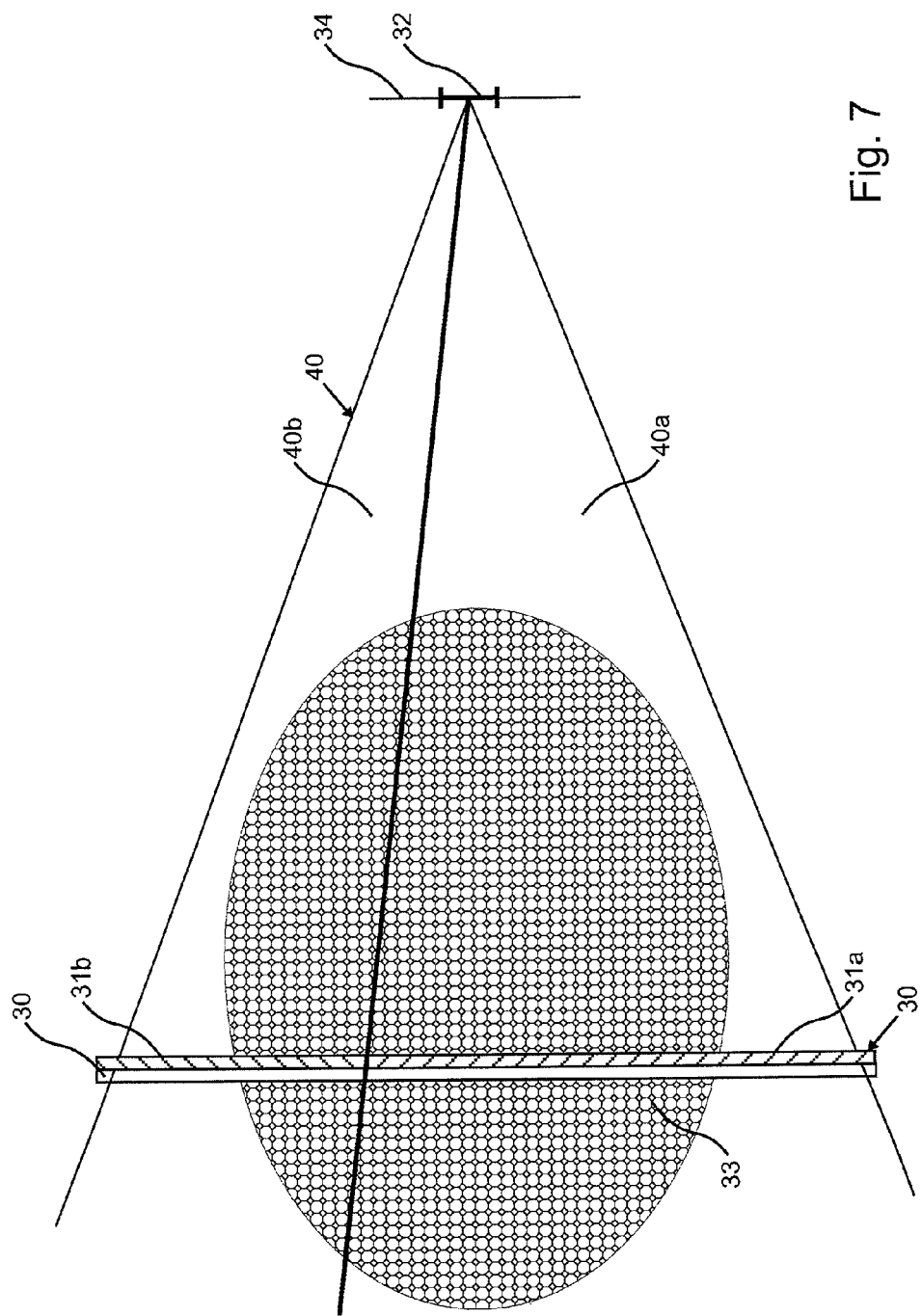

METHOD FOR ENCODING A HOLOGRAM IN A LIGHT MODULATION DEVICE

CROSS REFERENCE TO RELATED APPLICATIONS

This application claims the priority of PCT/EP2012/074008, filed on Nov. 29, 2012, which claims priority to German Application No. 10 2011 055 944.2, filed Dec. 1, 2011, and German Application No. 10 2011 056 006.8, filed Dec. 2, 2011, the entire contents of each of which are incorporated fully herein by reference.

BACKGROUND OF THE INVENTION

The invention relates to a method for encoding at least one hologram in a light modulation device, the encoding of which is carried out pixelwise, wherein the hologram is constructed from individual subholograms which are assigned to corresponding encoding regions in the light modulation device and which are respectively assigned to an object point of the object to be reconstructed with the hologram, wherein, with a virtual observer window, a defined viewing region is provided through which a reconstructed scene in a reconstruction space is observed by an observer, wherein a complex value of a wavefront for each individual object point is calculated in the virtual observer window and at least one value part of this complex value is corrected with a correction value and wherein the corrected complex values determined in this way for all object points are summed and transformed into the hologram plane of the light modulation device, in order to encode a hologram.

The invention furthermore relates to a method for encoding at least one hologram in a light modulation device, the encoding of which is carried out pixelwise, wherein the hologram is constructed from individual subholograms which are assigned to corresponding encoding regions in the light modulation device and which are respectively assigned to an object point of the object to be reconstructed with the hologram, wherein, with a virtual observer window, a defined viewing region is provided through which a reconstructed scene in a reconstruction space is observed by an observer, wherein each object point of the object to be reconstructed is holographically encoded in a subhologram, wherein amplitudes of the subholograms are corrected with a correction value and the subholograms corrected in this way are summed in the hologram plane, in order to encode a hologram.

As is known from prior documents of the Applicant, three-dimensional object data of the three-dimensional scene to be represented are written as a diffraction pattern of the scene to be reconstructed into encoding regions of a light modulation device. In this case, the calculation of the wavefront is carried out only for a small virtual observer window, which establishes a viewing region in an observer plane for an observer observing the reconstructed scene in a reconstruction space. The virtual observer window is in this case as large as or only minimally larger than the diameter or of the eye pupil of an eye of an observer. This, however, means that the virtual observer window may for example also be two or three times as large as the diameter of the eye pupil. It is therefore possible for the object points of the scene to be reconstructed to be encoded only in a small region of the light modulation device, defined by the respective object point, as so-called subholograms. In order to encode an object point in a subhologram, the complex light distribution of this object point or of an object section plane in the observer plane comprising the virtual observer window is calculated.

The light modulation device used may in this case be formed transmissively or reflectively, it having an arrangement of pixels as the modulation elements, which are separated from one another by intermediate spaces. In order to encode the pixels in amplitude and/or phase in the light modulation device, an electrode arrangement is provided, which is formed and arranged in the light modulation device in such a way that almost rectangular free spaces, which function as so-called pixels with a finite extent and constant amplitude transparency and/or phase transparency, are respectively formed between the electrodes. The pixels therefore have a defined pixel spacing from one another.

The almost rectangular configuration of the pixels is, however, disadvantageous to the extent that the complex wavefront in the predefined virtual observer window, and consequently also the reconstruction of the three-dimensional object in the reconstruction space between the virtual observer window and a hologram plane of the light modulation device, is vitiated by the effects of the finite pixel extent in the light modulation device. This means that, for example, undesired intensity changes may occur inside the virtual observer window. If the virtual observer window is larger than the eye pupil, then this effect is increasingly amplified. For example, the reconstructed three-dimensional scene may appear darker for a position of the eye pupil of an observer in the edge region or at the edge of the virtual observer window than for a position of the eye pupil of the observer in the middle of the virtual observer window. In other words, such a rectangular pixel aperture and pixel transparency has the effect that the intensity of the reconstructed three-dimensional scene, as perceived by the observer through the virtual observer window, may undesirably decrease from the middle of the virtual observer window toward its edge.

Solutions to this problem are known, for example, from DE 10 2006 042 467 A1 and DE 10 2008 000 589 A1 in the name of the Applicant. The way in which effects of the pixel transparency of a light modulation device on the intensity distribution in a virtual observer window of a holographic device can be corrected is described therein.

In DE 10 2006 042 467 A1 the correction is carried out in that, for a hologram calculation when applying Fourier transformation, the complex values of the object points or of the object section planes in a virtual observer window are modified by multiplying them by the reciprocal of the transform of the pixel shape and the pixel transparency, before the corrected complex values are summed and transformed into the hologram plane of the light modulation device.

For direct calculation of subholograms from object points, DE 10 2008 000 589 A1 describes that the correction of the pixel shape and of the pixel transparency is carried out in such a way that the amplitudes of the subholograms are multiplied by a suitably scaled reciprocal of the transform of the pixel shape and of the pixel transparency. The corrected subholograms are then summed to form a hologram.

For understanding of the calculation of subholograms or the encoding of holograms into the light modulation device, reference is made for example to WO2004/044659 A2, in which a device for the reconstruction of video holograms is described. FIG. 1 of the present application schematically represents such encoding, a three-dimensional object 1 being constructed from a plurality of object points, of which only four object points 1$a$, 1$b$, 1$c$ and 1$d$ are represented here in order to explain the encoding. A virtual observer window 2 is furthermore shown, through which an observer (indicated here by the eye represented) can observe a reconstructed scene. With the virtual observer window 2 as a defined viewing region and the four selected object points 1a, 1b, 1c and 1d, a pyramidal body is respectively projected through these object points 1a, 1b, 1c and 1d and in continuation onto a modulation surface 3 of the light modulation device (not represented in detail here). In the modulation surface 3, this results in encoding regions in the light modulation device which are assigned to the respective object points 1a, 1b, 1c and 1d of the object, in which the object points 1a, 1b, 1c and 1d are holographically encoded in a subhologram 3a, 3b, 3c and 3d. Each subhologram 3a, 3b, 3c and 3d is therefore written, or encoded, in only one region of the modulation surface 3 of the light modulation device. As can be seen from FIG. 1, depending on the position of the object points 1a, 1b, 1c and 1d, the individual subholograms 3a, 3b, 3c and 3d may overlap fully or only partially (i.e. only in certain regions) on the modulation surface 3. In order to encode, or write, a hologram for the object 1 to be reconstructed into the modulation surface 3 in this way, the procedure described above must be carried out with all object points of the object 1. The hologram is therefore constructed from a multiplicity of individual subholograms 3a, 3b, 3c, 3d, . . . 3$_n$. The holograms computer-generated in this way in the light modulation device are illuminated for reconstruction by an illumination device (not represented here) in conjunction with an optical system.

Holograms for such a device for the reconstruction of holograms may, for example, be calculated by the method described in DE 10 2004 063 838 A1. DE 10 2004 063 838 A1 is intended to be fully incorporated here. It is, however, also possible that in the calculation of holograms, instead of the transformation of object section planes into the virtual observer window for the calculation there of a complex value distribution, according to DE 10 2004 063 838 A1, a complex value of a wavefront is respectively calculated for each individual object point of the object in the virtual observer window.

An alternative method for the calculation of holograms, which is likewise described by the Applicant, is based on an analytical calculation of subholograms in the modulation surface of the light modulation device in the form of lens functions.

With reference to FIG. 1, the individual subholograms 1a, 1b, 1c and 1d within the section of the hologram defined by the encoding regions have an essentially constant amplitude, the value of which is determined as a function of brightness and distance of the object points, and a phase which corresponds to a lens function, the focal length of the lens as well as the size of the encoding regions varying with the depth coordinate of the object point. Outside the section defined by the encoding regions, the amplitude of the individual subhologram has the value 0. The hologram is obtained by the complex-value sum of all subholograms 1a, 1b, 1c, 1d . . . 1$_n$.

For the calculation of the hologram according to this alternative method, however, the complex value of a wavefront in the virtual observer window is not explicitly computationally determined. The method thus does not use a Fourier or Fresnel transformation. The calculation therefore has the advantage of substantially less computation time in comparison with the method described in document DE 10 2004 063 838 A1.

In a holographic device, besides the aforementioned pixel aperture of the light modulation device, there may for example be other optical components which can lead to a change in the intensity visible to the observer of a three-dimensional scene in the reconstruction space. Such components may, for example, be volume gratings (also referred to as volume holograms).

Volume gratings are diffraction gratings having a spatio-periodic variation in the absorption coefficient or the refractive index with arbitrary thickness. This means that volume gratings conventionally denote three-dimensional grating structures which are recorded in a medium that is thick in comparison with the wavelength of the illumination light. Glass may for example be used as the medium, although other materials may also be employed. Volume gratings offer the advantage that a plurality of gratings can be generated layerwise in a continuous medium.

Furthermore, volume gratings are generally distinguished by an angle selectivity, which means that the diffraction efficiency of a volume grating varies with the incidence angle of the incident light. Conventionally, this angle selectivity is generally used as an advantage. Under certain circumstances, however, too narrow an angle selectivity of the volume grating may also have perturbing influences on the holographic device for the reconstruction of three-dimensional scenes. When a volume grating is arranged in the beam path of a holographic device downstream of a light modulation device, too narrow an angle selectivity may, for example, lead to light which travels from a pixel of the light modulation device to a position at the edge of a virtual observer window in an observer plane being transmitted with a lesser efficiency by the volume grating than light which travels to the middle or center of the virtual observer window in the observer plane.

SUMMARY OF THE INVENTION

It is therefore an object of the present invention to refine a method of the type mentioned in the introduction in such a way that the aforementioned problems are avoided and, in particular, to provide a method in which the angle selectivity of at least one volume grating, provided in the beam path of a preferably holographic device, is taken into account in a hologram calculation.

According to the invention, the present object is achieved by the features of patent claims 1 and 2. The solution to the object may be achieved in two alternative ways, depending on which hologram calculation method already indicated in detail above is employed.

A first proposed way relates to a method for encoding at least one hologram in a light modulation device, which is characterized in that before the transformation of the summed complex value of all object points of the object to be reconstructed into the hologram plane, each amplitude of a complex value of a wavefront in the virtual observer window is multiplied by a correction value with which a correction of the angle selectivity of at least one volume grating arranged downstream in the beam path of the light modulation device is carried out, wherein the correction value is calculated from the root of the reciprocal value of the relevant angle-dependent diffraction efficiency of the at least one volume grating.

For the calculation of a hologram by means of a virtual observer window in an observer plane, the amplitude of the complex-value hologram values in the virtual observer window is respectively multiplied by a correction value, which is characterized by the root of the reciprocal value of the diffraction efficiency of at least one volume grating, while the phase value of the complex-value hologram values remains unchanged. In this way, errors which may be caused by the angle selectivity of volume gratings arranged in the beam path downstream of a light modulation device can jointly be taken into account in the hologram calculation by their being corrected or almost corrected. In this way, the efficiency of the light in the virtual observer window is at least approximately equal at all points or positions. This means that the light travelling from a pixel of the light modulation device being used to a position at the edge of the virtual observer window is transmitted by the at least one volume grating with almost the same efficiency as the light travelling to the middle or center of the virtual observer window.

If the hologram, or a subhologram of the hologram, is calculated directly in the plane of the light modulation device, as mentioned above, then the hologram calculation is alternatively characterized according to the invention in that each individual amplitude of each subhologram is corrected with a correction value with which a correction of the angle selectivity of at least one volume grating arranged downstream in the beam path of the light modulation device is carried out, wherein the correction value is calculated from the root of the reciprocal value of the relative angle-dependent diffraction efficiency of the volume grating.

Accordingly, in the case of pointwise calculation of subholograms on the light modulation device, the correction value is rescaled from the extent of the virtual observer window in the observer plane to the extent of a subhologram. In this case, for the rescaling or conversion of the correction value from the observer plane into the plane of the light modulation device, use is made of a geometrically optical approximation, which is to say, essentially, light rays from the edges of a subhologram extend through an object point of an object to be reconstructed to the edge of the virtual observer window, and light rays from the middle of the subhologram extend through the same object point to the middle of the virtual observer window.

The mathematically exact correction, which corresponds to multiplication of the amplitude of a wavefront of the object point in the virtual observer window by the root of the reciprocal value of the relative diffraction efficiency of the volume grating or a plurality of volume gratings, can be approximately replaced by a calculation in the plane of the light modulation device or an image thereof, in that multiplication of the subhologram by the correction value correspondingly scaled to the width of the subhologram is carried out there.

The term "scaling to the width of the subhologram" may in this case be understood as follows: a root of the reciprocal value of the relative diffraction efficiency of a volume grating may, for example, have the magnitude "1" at the center of the virtual observer window and the magnitude "1.3" at the edge of the virtual observer window, a correction of the angle selectivity of the volume grating being carried out in such a way that the amplitude of a subhologram is then multiplied by the correction value "1.0" in the middle of the encoding region of the subhologram and by the correction value "1.3" at the edge of the encoding region of the subhologram. In encoding regions lying between the edge and the middle of the encoding region, the respective amplitude is multiplied by correspondingly assigned correction values of between 1.0 and 1.3.

The direct calculation of subholograms in the plane of the light modulation device, or in the hologram plane, has the crucial advantage over the calculation of subholograms by means of the virtual observer window that the subholograms can be calculated more simply and therefore more rapidly. Correspondingly, the joint incorporation according to the invention of the correction of the angle selectivity of one or more volume gratings into the hologram calculation can also deliver a faster result.

For both hologram calculation methods mentioned above, the relative diffraction efficiency of a volume grating to be used in a holographic device is advantageously determined once computationally in that, before the correction of a complex value of a wavefront in the virtual observer window or before the correction of the amplitudes of the subholograms, a ray bundle coming from a pixel of the light modulation device through the at least one volume grating to various positions within the virtual observer window is geometrically calculated, whereupon the incidence angle of a light ray of the ray bundle onto the volume grating is respectively calculated, whereupon the diffraction efficiency of the volume grating for the respective incidence angle is determined.

The diffraction efficiency of a volume grating may, for example, be experimentally determined by means of a measurement of the diffracted light intensity for a defined input intensity as a function of the incidence angle, or, in the simplest case, it may also be determined computationally according to Kogelnik theory.

Each volume grating therefore has its own diffraction efficiency which, for example, is stored in a processor and is used for the calculation of the hologram, or of subholograms.

If a plurality of volume gratings arranged downstream in the beam path of the light modulation device are provided, then, advantageously, a ray bundle coming from a pixel of the light modulation device through the volume gratings to various positions within the virtual observer window can be geometrically calculated, whereupon the incidence angles of light rays of the ray bundle coming from the pixel onto the individual volume gratings are respectively calculated, whereupon the diffraction efficiencies of the volume gratings for the respective incidence angles are determined, and whereupon the diffraction efficiencies of the individual volume gratings for the respective position of the light rays respectively incident on the volume gratings in the virtual observer window are multiplied, in order to obtain a relative diffraction efficiency after the individual volume gratings for the respective position in the virtual observer window and for this light ray. This relative diffraction efficiency can then be used for determining the correction value.

In another advantageous configuration of the invention, the correction values at the center of the virtual observer window (10,32), at the edge of the virtual observer window (10,32) and for positions between the edge and the center of the virtual observer window (10,32) may have a magnitude in a value range of about 1.0 to ±2.0, the individual correction magnitudes differ from one another.

This means, for example, that the correction value has a magnitude of about 1.02 at the center or in the middle of the virtual observer window and a magnitude of about 1.06 at the edge of the virtual observer window, the correction value for positions between the edge and the center or middle of the virtual observer window having a magnitude of between about 1.02 and ±1.06.

The correction of the angle selectivity of a volume grating may then be carried out in such a way that the determined amplitude of a complex value of a wavefront in the virtual observer window at the center or in the middle of the virtual observer window is respectively multiplied by the magnitude of about 1.02, at the edge of the virtual observer window by the magnitude of about 1.06, and determined amplitudes respectively lying between these of complex values of wavefronts by an assigned magnitude of between about 1.02 and 1.06.

As an alternative to this, the correction of the angle selectivity of a volume grating may also be carried out in such a way that an amplitude of a subhologram at the center or in the middle of the subhologram is multiplied by the magnitude of about 1.02, at the edge of the virtual observer window by the magnitude of about 1.06, and amplitudes respectively lying between these of the subhologram by an assigned magnitude of between about 1.02 and 1.06.

Furthermore, in another configuration of the invention, when at least one volume grating (31) in the beam path having different diffraction efficiencies in different regions is used for correction of the angle selectivity of the volume grating (31) a frustum (40) spanned between the light modulation device (30) and the virtual observer window (32) may be subdivided into at least two subfrustums (40a,40b), whereupon complex values of a wavefront in the virtual observer window (32) are calculated separately for all object points of a 3D scene which lie in the respective subfrustum for each individual subfrustum (40a,40b), and whereupon correction values for each individual subfrustum are determined separately and whereupon the corrected complex values of the wavefront in the observer window of the individual subfrustums are summed and transformed into the hologram plane of the light modulation device, in order to encode a hologram.

A large-area volume grating may, for example, have a slightly different diffraction efficiency in one region than in an e.g. neighboring region owing to tolerances in its production. For example, the volume grating could have a diffraction efficiency of 95% in a surface section at the top left for a particular incidence angle of the light, but only a diffraction efficiency of 90% in another surface section at the bottom right for the same incidence angle of the light. This means that a volume grating may have a plurality of diffraction efficiencies owing to production defects, so that a single diffraction efficiency existing over the entire volume grating cannot be achieved. For this reason, it is of course also advantageous to take the different diffraction efficiencies of a volume grating into account in the correction of the angle selectivity. Subfrustums are therefore used for this, that is to say depending on the scope of the change in the diffraction efficiencies within the area of the volume grating, the frustum is divided into a corresponding number of subfrustums. For example, the diffraction efficiency of the volume grating may in this case be measured in a grid of positions and all positions whose diffraction efficiencies match within a predetermined interval are used to form a subfrustum. For the example mentioned with a diffraction efficiency variation over a large-area volume grating for a predetermined incidence angle of 95% at the top left to 90% at the bottom right, for example, all positions in which the diffraction efficiency varies between 95% and 94% could be combined to form one subfrustum, all positions between 94% and 93% to form another, and so on.

Other advantageous configurations and refinements of the invention may be found in the other dependent claims.

There are now various possibilities for advantageously configuring and refining the teaching of the present invention and/or combining the embodiments described above with one another—as far as is possible. In this regard, reference is made on the one hand to the patent claims dependent on patent claim 1 and patent claim 2, and on the other hand to the following explanation of the preferred exemplary embodiments of the invention with the aid of the drawing. In connection with the explanation of the preferred exemplary embodiments of the invention with the aid of the drawing, preferred configurations and refinements of the teaching are in general also explained.

BRIEF DESCRIPTION OF THE DRAWINGS

In the drawing:

FIG. 5b schematically shows the correction values calculated from the profile of the diffraction efficiency according to FIG. 5a;

FIG. 7 shows an outline representation of a holographic device, and the arrangement of a virtual observer window therefor in the representation of a reconstructed three-dimensional scene.

DETAILED DESCRIPTION OF THE INVENTION

Figure 2:
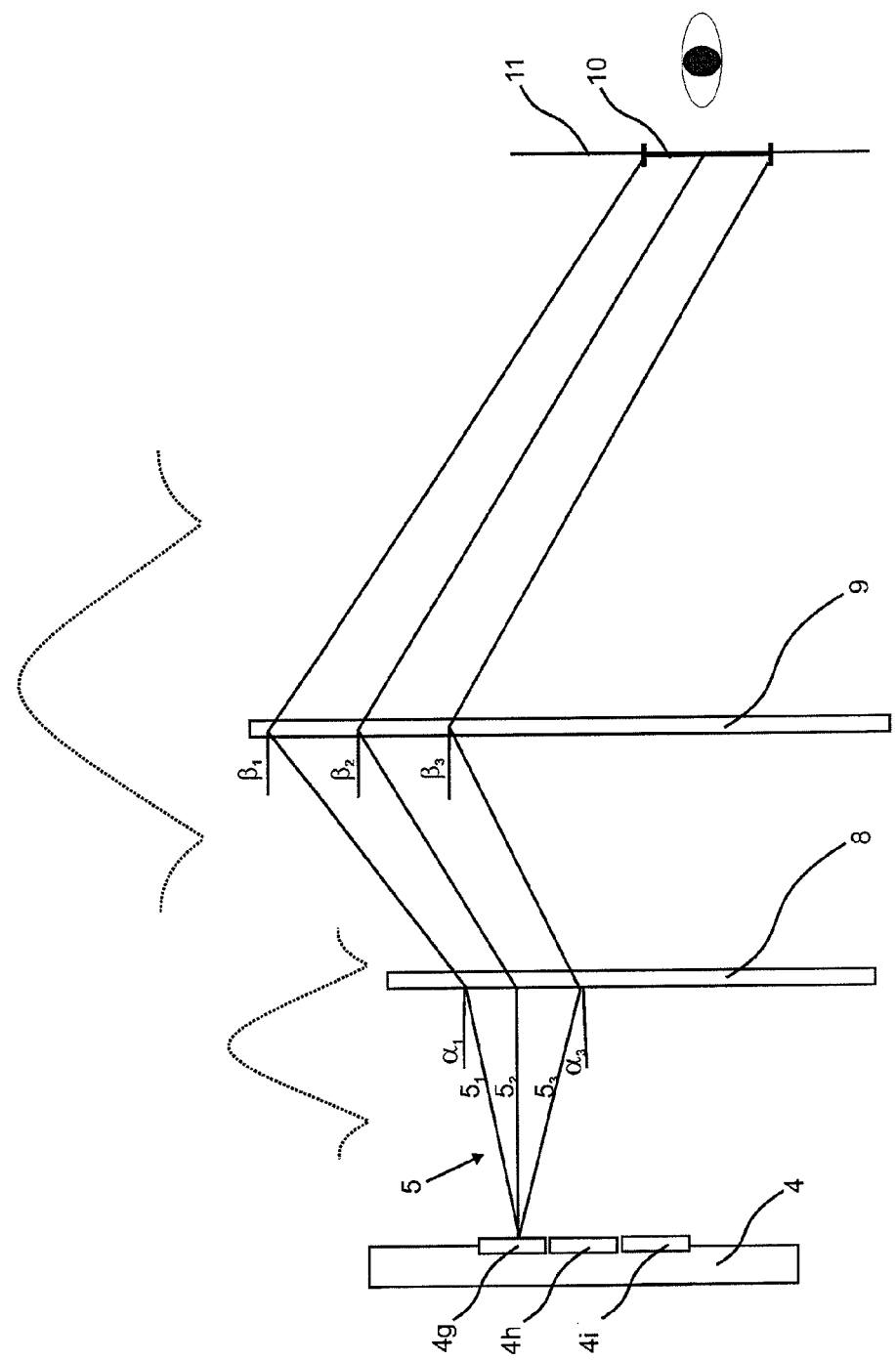
FIG. 2 shows an outline representation of the method according to the invention when using two volume gratings in the beam path downstream of a light modulation device.

FIG. 2 represents an arrangement, provided in a holographic device (not shown here), with which the correction method is to be explained in principle. The arrangement in this case comprises a light modulation device 4 (only schematically represented), in the modulation surface of which modulation elements are provided in the form of pixels $4a \ldots 4_n$. Here, however, for reasons of clarity, only three such pixels 4g, 4h, 4i are represented, a light bundle 5 being emitted by only one pixel, namely the pixel 4g. The light bundle 5 in turn, for simplification, has only three individual light rays $5_1$, $5_2$ and $5_3$, although as is known such a light bundle 5 contains very many light rays. The light modulation device 4 is illuminated by means of an illumination device (not represented), which in the preferred configuration may comprise at least one laser and in other possible configurations a number of LEDs (light-emitting diodes) or OLEDs (organic light-emitting diodes) as the light source, and of course also other optical elements, for example, collimation optics.

In this case, it should be noted that, in general, the diffraction efficiency of a volume grating also changes with the wavelength of the light used. If for example an LED light source having a spectral width of a few nanometers is used, then the correction should be carried out either for a central wavelength of the spectrum of the LED or with a correction value averaged over a plurality of wavelengths.

Volume gratings provided parallel at a distance from one another are arranged in the light direction downstream of the light modulation device 4, that is to say in the beam path of the light bundle 5, here two in number, namely a volume grating 8 and a volume grating 9. Volume gratings generally consist of materials, or a medium, having a spatially periodic modulation of the absorption coefficient or refractive index. The former volume gratings, having transmissive and non-transmissive regions, may for example be produced by a thin layer of a medium whose absorption coefficient has a value which lies between zero and a very large value. The latter volume gratings, having spatial modulation of the refractive index, may for example be produced by the exposure of a photopolymer. Spatial modulation of the refractive index is carried out by periodic light input during exposure. The layer thicknesses of volume gratings are large in comparison with the grating period. A typical thickness for a volume grating in a photopolymer may, for example, lie in a range of 10-20 micrometers.

It is expressly pointed out that the correction method according to the invention is not in this case restricted to a special type of volume gratings, but is generally applicable.

Furthermore, volume gratings may be configured for very narrow entry angles differing only little from one another. They can also be optimized for narrow wavelength ranges. In this case, high diffraction efficiencies of about 98% to 100% can be achieved. The volume gratings then act as angle filters, which means that only light of a narrow or tight angle range is diffracted into the intended direction. Furthermore, the volume gratings may also act as wavelength filters, so that only light of a selected wavelength range is diffracted into the direction intended therefor. Light of other wavelengths or having other incidence angles can then pass undiffracted through the volume grating, or the volume gratings.

In order to avoid higher diffraction orders when the light passes through the volume grating, or through the volume gratings, the Bragg condition should be complied with, that is to say as far as possible only one diffraction order should be transmitted, for example the first diffraction order or, depending on the application, the correspondingly desired diffraction order. The thicker a volume grating is formed, the greater is its selective effect.

The diffraction processes in volume gratings have been described in general by Kogelnik by means of the theory of coupled waves, see in this regard H. Kogelnik, "Coupled Wave Theory for Thick Hologram Gratings", Bell Syst. Techn. J. 48 (1969) 2909-2947. A thick hologram should have a Q factor according to the equation:

$Q = 2\pi d \lambda / (n_0 \Lambda^2)$ of more than 10, d being the thickness of the volume grating, $\lambda$ being the working wavelength in a vacuum, $\Lambda$ being the grating constant of the volume grating and $n_0$ being the average refractive power.

There are volume gratings which are optimized for a plurality of entry angles and/or a plurality of wavelengths. On the other hand, instead of the use of such a volume grating, it is also possible to arrange a plurality of volume gratings having fewer functions successively in a device, the individual volume gratings each individually deviating the incident light in the intended direction.

Volume gratings can also be influenced during their production in such a way that they can act as a field lens after their production. This means that field lens functions are exposed into the volume grating during its production, so that a field lens having a certain focal length is obtained.

Furthermore, it is also to be pointed out that, for example, a holographic device may usually comprise a plurality of volume gratings in the beam path, often four volume gratings. For the explanation of the exemplary embodiments, however, at most two volume gratings will be assumed here, although this is not intended to be restrictive.

For the explanation of the present method, a simple deviating volume grating will be assumed here, namely two volume gratings 8 and 9, which is arranged between the light modulation device 4 and a virtual observer window 10 in an observer plane 11 comprising an eye of an observer observing a preferably three-dimensional reconstructed scene. The virtual observer window 10 and the light modulation device 4, in particular the edges of the virtual observer window 10 and the edges of the light modulation device 4, together span a frustoconical reconstruction space 40, also referred to as a frustum (see in this regard FIG. 7), in which the reconstructed scene can be observed by the observer.

In order now to be able to jointly influence, or jointly take into account, the angle selectivity of the volume gratings 8 and 9 arranged in the beam path of the arrangement during the hologram calculation, the diffraction efficiency of the volume gratings 8 and 9 present is first determined. This may, for example, be done by a suitable measurement on the volume gratings or alternatively with the aid of a calculation of the diffraction efficiency of the angles with the parameters such as grating period and thickness according to Kogelnik theory. This diffraction efficiency can, for example, be stored in a table of values. Then, the beam path of the ray bundle 5 coming from the pixel 4g of the light modulation device 4 through the two volume gratings 8 and 9 at different positions within the virtual observer window 10 is geometrically calculated. This means that the ray bundle 5 as geometrically seen strikes the virtual observer window 10, from which it can be deduced that each light ray of the ray bundle 5 strikes a different position in the virtual observer window 10. This means that, for each volume grating 8 and 9, the incidence angle of the light rays of the ray bundle 5, here the incidence angle of the light rays $5_1$, $5_2$ and $5_3$, on these volume gratings 8 and 9 is respectively calculated individually, from which the diffraction efficiency for these incidence angles can be determined. In FIG. 2, this is represented in more detail by the three light rays $5_1$, $5_2$ and $5_3$, the light ray $5_1$ striking the volume grating 8 at an angle $\alpha_1$, being deviated and striking the volume grating 9 at an angle $\beta_1$. The light ray $5_2$ strikes the first volume grating 8 perpendicularly ($\alpha_2$), is deviated by it and strikes the second volume grating 9 at an angle $\beta_2$. Furthermore, the light ray $5_3$ emerges from the pixel 4g of the light modulation device 4 at the same angle as the light ray $5_1$, only with a different sign, strikes the volume grating 8 at an angle $\alpha_3$, is deviated by it and then strikes the downstream volume grating 9 at an angle $\beta_3$. For the individual incidence angles determined in this way for each light ray, here the light rays $5_1$, $5_2$ and $5_3$, the corresponding diffraction efficiency is consequently determined, whereupon the diffraction efficiencies of the individual volume gratings 8 and 9 for the respective position of the light rays respectively striking the volume gratings 8 and 9 in the virtual observer window are multiplied. In other words, the diffraction efficiency of the volume grating 8 for the light ray $5_1$ is multiplied by the diffraction efficiency of the volume grating 9 for the same light ray $5_1$, so that a relative diffraction efficiency of the two volume gratings 8 and 9 is obtained for this light ray $5_1$, and the associated incidence position of this light ray $5_1$ in the virtual observer window 10. This procedure as just described for determining the relative diffraction efficiency is also carried out for the light rays $5_2$ and $5_3$ of the ray bundle 5, that is to say for all light rays of a light bundle emerging from a pixel of the light modulation device 4. Furthermore, this method explained above is also applied for the other pixels 4$h$, 4$i$, . . . 4$_n$ present in the light modulation device 4, so that the relative diffraction efficiency is determined for each ray bundle coming from each pixel of the hologram or a subhologram of the light modulation device 4 and each volume grating arranged in the beam path.

The values of the diffraction efficiency are intensities. In the hologram calculation itself, amplitudes and phases are generally used. The amplitude is in this case proportional to the root of the intensity. In order therefore to correct the amplitudes correspondingly, it is therefore also necessary to use the root of the reciprocal value of the determined relative transmission or diffraction efficiency. A correction of the angle selectivity of one or more volume gratings arranged in the beam path during the hologram calculation is carried out in a first possibility, namely the hologram calculation by means of the virtual observer window, in such a way that the individual amplitudes of the calculated complex values of a wavefront in the virtual observer window 10 are multiplied by the corresponding root of the reciprocal value of the relative diffraction efficiency. The phase of the complex values in the virtual observer window 10, however, remains unchanged.

In a second possibility, namely the direct calculation of subholograms in the hologram plane, the amplitudes of a subhologram are corrected in such a way that the correction value is rescaled from the extent of the virtual observer window 10 to the extent of the corresponding subhologram. Here again, the phase of the subhologram remains unchanged.

A correction of the angle selectivity may, for example, be used when there is the same relative diffraction efficiency for all pixels of the light modulation device 4. Likewise, it may also be used when there is a similar relative diffraction efficiency in the virtual observer window 10 at least for such pixels of the light modulation device 4 within the maximum extent of a subhologram. For holographic devices having a virtual observer window, it applies that the subhologram size changes with the depth position of a scene point. For a depth range of the device which may extend arbitrarily far behind a display and up to half the observer distance in front of the device, however, the subholograms are respectively at most as large as the virtual observer window itself. For a virtual observer window with an extent of about 10 mm and the aforementioned depth range of the three-dimensional scene, a correction would thus for example be usable when there is almost the same diffraction efficiency over regions of about 10 mm.

In the case of an equal or approximately equal relative diffraction efficiency for all pixels, or for all pixels of a subhologram, for correction the amplitudes of the complex values in the virtual observer window 10, or the amplitudes of the subholograms, are multiplied by the root of the reciprocal values of the relative diffraction efficiency.

In the case of a relative diffraction efficiency which differs in different regions of the light modulation device, but is at least similar for pixels within the extent of a subhologram, it is more advantageous to calculate the subholograms directly in the light modulation device and carry out the correction with the calculated correction values there. In such a case, an averaged efficiency of the pixels over the respective subhologram may also be used.

For example, a simple deviating volume grating or a multiplex volume grating would in most cases satisfy the condition of the same diffraction efficiency for all pixels of the light modulation device.

If the volume grating is formed as a field lens, it is sometimes possible for it to have locally different deviation angles, so that the angle selectivity possibly changes over the volume grating acting as a field lens. This, however, usually takes place so slowly that the pixels of the light modulation device neighbored by these regions are in fact only slightly affected. For this reason, it is more expedient to calculate the subholograms directly and jointly take into account the corresponding correction value for the angle selectivity.

In the case of a time division multiplex of a light modulation device by means of one or more volume gratings, there may be different relative diffraction efficiencies for the same pixel in different multiplex configurations. Consequently, the calculation is to be carried out for all configurations and the relative diffraction efficiency assigned to the respective configuration is to be used. This means that the calculation of the corresponding correction value is to be carried out only once, in which case for each individual multiplex configuration the correction value assigned to this configuration must be jointly taken into account.

In general, the correction value or the magnitude of the correction will in fact lie in a range of 1.0 to ±2.0, this range not being intended to be restrictive. This means that the correction value may also have a magnitude of more than 2.0.

Figure 3:
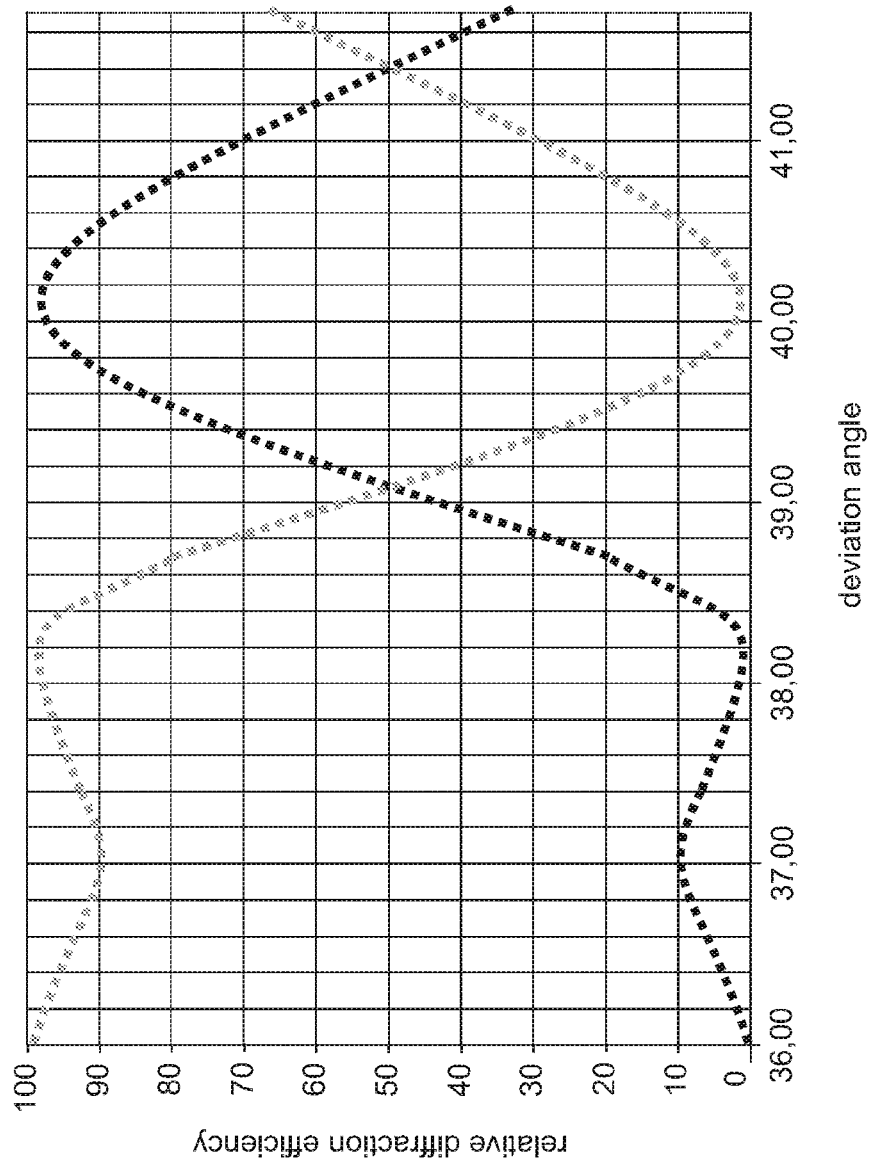
FIG. 3 shows a schematic representation of a curve of the diffraction efficiency of a volume grating.

The correction method will be described in more detail below with respect to an exemplary embodiment with the aid of FIGS. 3 to 6$b$. In this case, a volume grating which has the diffraction efficiency curve schematically shown in FIG. 3 is used. The graphical representation shows a measured curve of the diffraction efficiency of a volume grating, as may for example be used in a holographic device. In the graph, the diffraction efficiency is plotted against the deviation angle in the first diffraction order (black curve), and against the deviation angle in the zeroth diffraction order (light gray curve) according to Kogelnik theory for volume gratings. The first diffraction order in this case represents deviated light and the zeroth diffraction order undeviated light.

Figure 4:
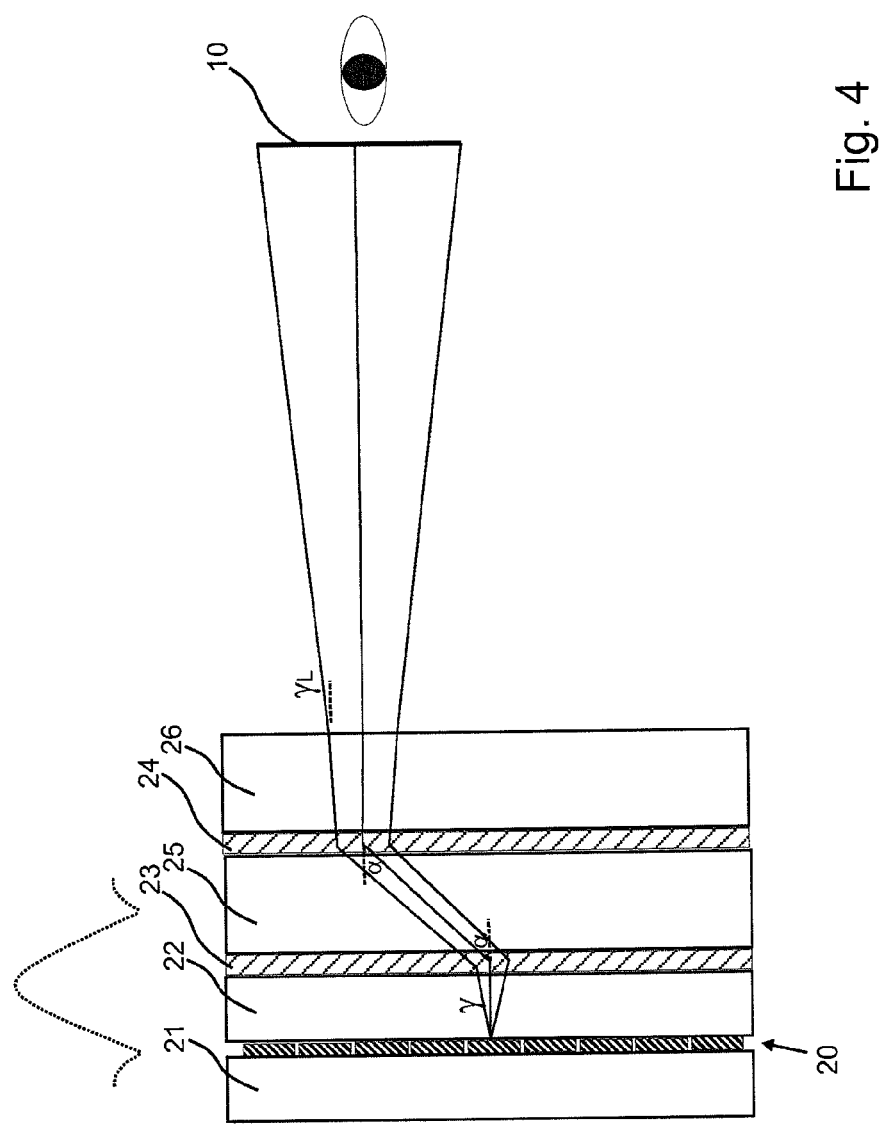
FIG. 4 shows an outline representation of a possible structure of a holographic device having a light modulation device and two volume gratings.

In FIG. 4, an arrangement of a holographic device, for example a direct view display, is represented schematically, only the elements important for the invention being shown, that is to say the holographic device may of course comprise further optical elements. Elements which are the same as in FIG. 2 also have the same references in FIG. 4. In general, for example, the holographic device comprises an illumination device, for example a backlight, or a lens or lens arrangement which focuses light of all pixels of a light modulation device 20 in the direction of the virtual observer window 10, or optionally also driveable deviating elements. Such additional elements may be constructed in various ways.

The light modulation device 20 represented in FIG. 4 consists of a light-modulating layer which is arranged between substrates 21 and 22, for example glass, as is the case for example in liquid crystal-based light modulation devices. The light modulation device 20 has a pixel pitch of about 30 μm here. The virtual observer window 10, through which an observer can observe a reconstructed three-dimensional scene in a reconstruction space (not shown here), is generated at a distance of about 70 cm from the light modulation device 20. The virtual observer window 10 should have a size of about 12 mm for green light ($\lambda$=532 nm) coming from the illumination device (not represented).

Provided downstream of the light modulation device 20 in the beam direction, there are volume gratings 23 and 24 arranged parallel behind one another, which in this exemplary embodiment consist of polymer sheets that are laminated onto a medium or substrate as carrier material. The carrier material is in this case glass, although other carrier materials may of course also be used. In this embodiment as represented here and for simpler explanation of the invention, the two volume gratings 23 and 24 are to have the same properties, that is to say the same diffraction efficiency.

In the present case, the volume grating 23 or 24, respectively, has the task of deviating the light emerging from a pixel of the light modulation device 20 and striking the volume grating 23 by an angle of about 40 degrees in the carrier material of the volume grating 23, which has a refractive index of about 1.5 here. According to FIG. 3, owing to production tolerances, the volume grating 23 or 24, respectively, has a maximum diffraction efficiency of about 98% for a deviation angle of about 40.1 degrees instead of the required 40.0 degrees, and for example a diffraction efficiency of about 90% for a deviation angle of about 39.7 degrees and a deviation angle of about 40.5 degrees.

If the light modulation device 20 and the virtual observer window 10 have the properties indicated above, then for the geometrical calculation of the beam path from a pixel to the virtual observer window 10, as presented in FIG. 2, the diffraction angle from a pixel of the light modulation device 20 to the edges of the virtual observer window 10 is about ±0.5 degrees in air, or ±0.33 degrees in a carrier material having a refractive index of 1.5 (for example glass).

According to FIG. 4, a light ray which emerges straight, that is to say at an angle of 0 degrees, from a pixel of the light modulation device 20 is deviated by the first volume grating 23 by the angle α and by the second volume grating 24 by the angle −α. The light which in the substrate 22, here for example likewise glass, emerges at an angle γ from a pixel then travels in air after the volume gratings 23, 24 and a further substrate 26 at an angle $\gamma_L$ in the direction of the virtual observer window 10. More precisely, this means that the light, modulated by the light modulation device 20, of a pixel strikes the first volume grating 23, is deviated by it by about 40 degrees and then, by a spacer 25 arranged between the volume grating 23 and the volume grating 24, experiences a lateral offset and consequently strikes the second volume grating 24, arranged downstream of the volume grating 23, and is guided straight again by the latter. The spacer 25 should here likewise consist of a medium having a refractive index of 1.5, for example glass, although other transparent materials may of course also be used. For the exemplary embodiment represented in FIG. 4, owing to production tolerances of the two identically designed volume gratings 23 and 24, this means: a light ray which emerges from a pixel at an angle γ of 0 degrees is deviated by the volume grating 23 by an angle α=40.1 degrees and by the subsequent volume grating 24 by an angle −α=40.1 degrees, and then leaves this volume grating 24 at an angle of 0 degrees. This light ray then strikes the middle or center of the virtual observer window 10. The determined diffraction efficiency at the first, and simultaneously at the second, volume grating 23, 24 is then respectively 98%. The overall relative diffraction efficiency for this light ray after the two volume gratings 23 and 24 is therefore 96% (0.98%×0.98%).

For a light ray from a pixel to the edge of the virtual observer window 10, the following calculation with respect to FIG. 4 is for example carried out. A light ray emerging from a pixel at an angle of γ=0.33 degrees (in glass) is deviated according to the grating equation $$\sin\gamma + \frac{\lambda}{\delta} = \sin\alpha,$$

where γ is the incidence angle, λ is the wavelength used, δ is the grating period and α is the emergence angle, by the first volume grating 23 at an angle of 40.4 degrees, after striking the second volume grating 24 is deviated by the latter by −40.4 degrees, and then emerges at an angle of 0.33 degrees in glass as carrier material from the second volume grating 24. As schematically represented, there is a glass/air transition on a front surface 27 of the holographic device, so that the light ray emerges at an angle of 0.5 degrees in air from the holographic device and is directed onto the edge of the virtual observer window 10. At an angle of 40.4 degrees, the diffraction efficiency is consequently 94%. The overall relative diffraction efficiency after the two volume gratings 23 and 24 with the same diffraction efficiency is in this case accordingly 88% (0.94%×0.94%). The same applies for a light ray emerging from a pixel at −0.33 degrees in glass as substrate 22, or at an angle of −0.5 degrees in air as substrate 22.

This means that there are relative diffraction efficiencies of between 96% and 88% for other angles between 0 and 0.33 degrees emerging from a pixel.

Figure 5B:
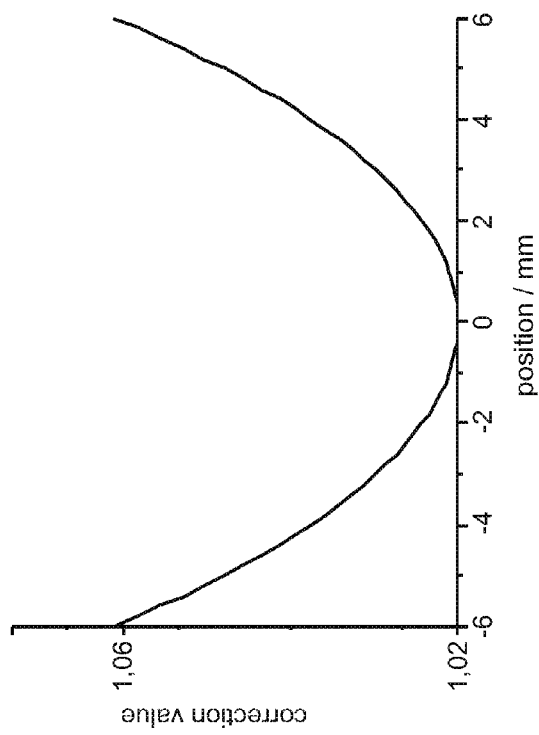
Figure 5A:
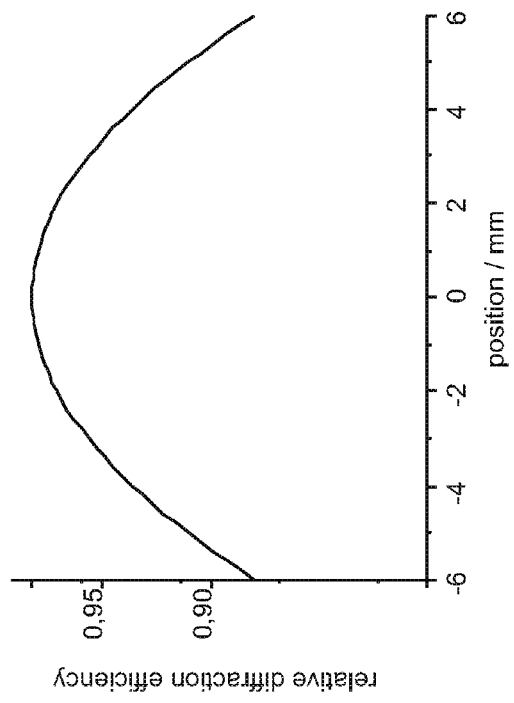
FIG. 5a schematically shows a profile of the diffraction efficiency over a virtual observer window.

Overall, for the approximately 12 mm wide virtual observer window 10, a relative transmission profile of 96% is therefore established in the middle or at the center, decreasing continuously to 88% respectively at the left and right edges of the virtual observer window 10, as seen ±6 mm from the middle, as is represented in FIG. 5a by the schematic profile of the diffraction efficiency over the virtual observer window 10.

FIG. 5b shows the correction values calculated from the relative transmission profile according to FIG. 5a. The amplitude of the complex-value hologram values calculated for the hologram calculation in the virtual observer window 10 is multiplied by the corresponding correction values represented in FIG. 5b, in order to correct the angle selectivity of the volume gratings 23 and 24. The phase of the complex-value hologram values remains unchanged in this case. This means, according to the exemplary embodiment represented according to FIGS. 4, 5a and 5b, that the amplitude in the virtual observer window 10 is multiplied by $$\sqrt{\frac{1}{0.96}}$$

for a correction of the amplitude in the middle or at the center of the virtual observer window 10, which gives a correction value of about 1.02 for the middle, as in FIG. 5b. Furthermore, the amplitude in the virtual observer window 10 is multiplied by $$\sqrt{\frac{1}{0.88}}$$

for a correction of the amplitude on the left or right edge of the virtual observer window 10, which gives a correction value of about 1.06 for the left and right edges. The calculated amplitudes of the complex-value hologram values for positions between the edges and the middle of the virtual observer window 10 are multiplied by the corresponding calculated correction values, here from about 1.02 to 1.06 according to FIG. 5b.

In the alternative hologram calculation, that is to say direct calculation of subholograms in the plane of the light modulation device 20, the correction value determined for the corresponding amplitude is rescaled from the extent of the virtual observer window 10 to the extent of the associated subhologram. According to the exemplary embodiment above according to FIG. 5b, it follows that the amplitude of the subhologram in the middle or at the center of the subhologram is multiplied by a correction value of the middle of the virtual observer window 10, here by about 1.02, and the amplitude at the edge of the subhologram is respectively multiplied by the correction values of the edge of the virtual observer window 10, here by about 1.06.

Figure 1:
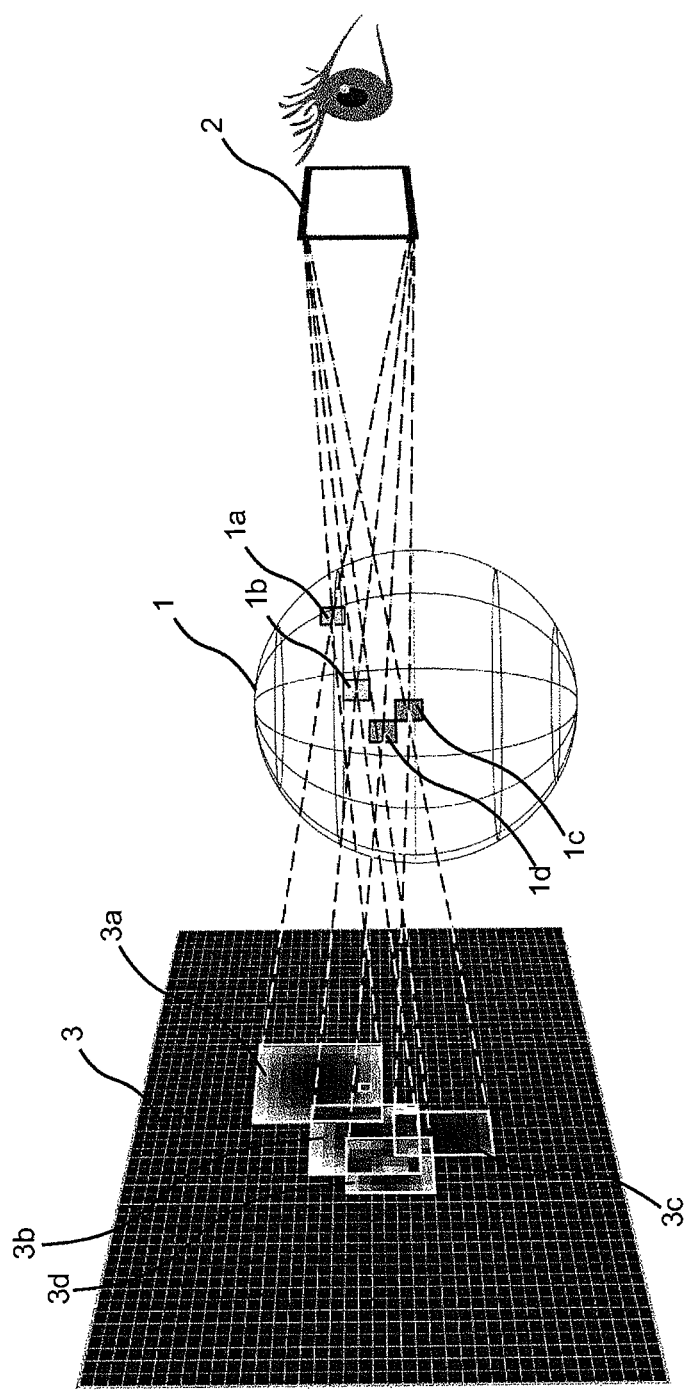
FIG. 1 shows a schematic representation of a method for the reconstruction of a three-dimensional object with a computer-generated hologram according to the prior art.
Figure 6A:
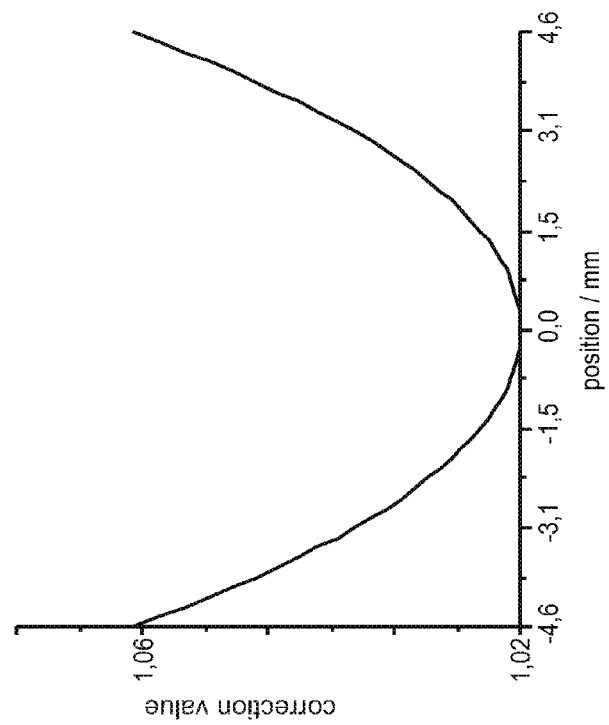
FIG. 6a schematically shows the correction values for a small subhologram to be calculated directly in the plane of the light modulation device and to be corrected.
Figure 6B:
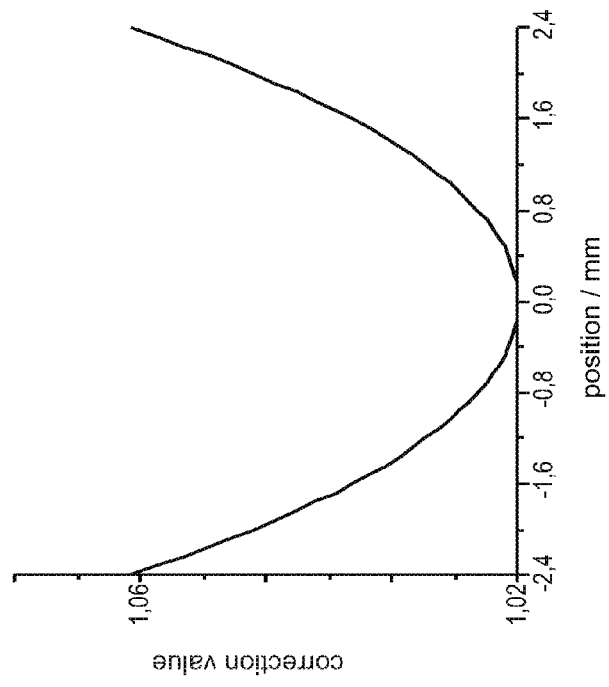
FIG. 6b schematically shows the correction values for a larger subhologram compared with FIG. 6a, to be calculated directly in the plane of the light modulation device and to be corrected.

FIGS. 6a and 6b schematically show such a correction of amplitudes of a subhologram, the calculated correction values for two subholograms differing in the size of their extent being represented here. FIG. 6a shows the correction value profile for a subhologram whose extent is small, FIG. 6b representing the correction value profile for a subhologram whose extent is large. The size, or extent, of the subholograms in the modulation surface of a light modulation device is given, as is known, by the distance from the object points of an object to be reconstructed to the light modulation device and to the virtual observer window, as can be seen in FIG. 1. This means that the closer an object point lies in the light modulation device, the smaller the corresponding subhologram is, and the further away an object point is from the light modulation device, the larger the corresponding subhologram is. Depending on the size, or extent, of the subholograms, the correction values are differently compressed or stretched, as shown by FIGS. 6a and 6b.

An exemplary embodiment will be described below, in which the correction value is not the same over the entire holographic device, as in the exemplary embodiment described above. FIG. 7 shows in outline a holographic device, only a light modulation device 30, a volume grating 31 and the arrangement of a virtual observer window 32, of a three-dimensional scene 33 and of a frustum 40 being represented. Of course, this holographic device also comprises other elements, such as an illumination device, a lens etc. Furthermore, it is only schematically indicated here that the three-dimensional scene 33 is decomposed for the hologram calculation into individual object points, which respectively form the basis for the calculation of complex hologram values in the virtual observer window 32, or for the direct calculation of subholograms in the plane of the light modulation device 30. The frustum 40, or more generally the field of view of an observer present in an observer plane 34, namely the volume in which a reconstructed three-dimensional scene is visible to an eye of the observer through the virtual observer window 32, extends in this exemplary embodiment frustoconically from the virtual observer window 32 to the edges of the light modulation device 30, and through the latter, particularly in the case of object points behind the light modulation device 30.

The volume grating 31 comprises, for example, a region 31a having a known diffraction efficiency and a region 31b having a diffraction efficiency differing therefrom. A volume grating used in holographic devices should usually be formed with a large area, although defects can therefore occur in its production. In this way, for example, there may be a slightly different diffraction efficiency in one region of the volume grating than in another region of the same volume grating. In order to be able to jointly take this into account during the hologram calculation, the frustum 40 is subdivided into a subfrustum 40a and a subfrustum 40b. This means that the extent of the change in the diffraction efficiency in a given volume grating determines the number of subfrustums. In general, the diffraction efficiency in a volume grating does not change abruptly, although for example a region 31a may be established in that the diffraction efficiency of the volume grating 31 varies only within a sufficiently small tolerance interval in this region, for example between 94.5% and 95.5% around the desired value of 95%. The region 31b is then determined in that the diffraction efficiency differs therein from the average value in 31a by more than the tolerance interval. Within the region of 31b, however, the variation in the diffraction efficiency is likewise less than a predetermined tolerance interval. For example, it could vary between 93.5% and 94.5% here. In this exemplary embodiment, the volume grating 31 has two different diffraction efficiencies, as indicated above, so that the frustum 40 is therefore divided into the two subfrustums 40a and 40b. The calculation of the hologram values in the virtual observer window 32 is therefore carried out individually for each subfrustum, or section. This means that the calculation of the hologram is carried out in a first substep with all object points of the three-dimensional scene 33 which lie in the subfrustum 40a, a correction being carried out with the correction value according to the diffraction efficiency of the volume grating region 31a. Separately from this, in a subsequent substep, the hologram is furthermore calculated with all object points of the three-dimensional scene 33 which lie in the subfrustum 40b, and a correction is carried out with the correction value according to the diffraction efficiency of the volume grating region 31b. Naturally, it is also possible to correct first the values of the subfrustum 40b and then the values of the subfrustum 40a with the corresponding correction value.

For direct calculation of a subhologram in the plane of the light modulation device when using a volume grating having a plurality of diffraction efficiencies, here again the correction values also need to be rescaled from the extent of the virtual observer window 32 to the extent of a subhologram.

If a plurality of volume gratings are used in a holographic device, which respectively each have different diffraction efficiencies, then the hologram calculation should advantageously be carried out according to the combination of the exemplary embodiments according to FIGS. 4 and 7.

The correction values according to the exemplary embodiment according to FIGS. 3 to 6b are still comparatively small. A holographic device may, however, also comprise more than two volume gratings, so that larger corrections might generally be necessary. Even if a light modulation device has relatively small pixels, as for example when using an LCoS (liquid crystal on silicon), which have a relatively high diffraction angle, much larger corrections need to be carried out when using volume gratings with the same properties.

In a hologram calculation, besides a correction of the angle selectivity of volume gratings being used, further corrections, for example correction of the pixel transparency of a light modulation device being used, must, should or may be necessary.

Finally, it should more particularly be pointed out that the exemplary embodiments explained above merely serve to describe the claimed teaching, but they do not restrict it to the exemplary embodiments. In particular, the exemplary embodiments described above may—in so far as is possible—be combined with one another.

The invention claimed is:

1. A method for encoding at least one hologram in a light modulation device, the encoding of which is carried out pixelwise, wherein the hologram is constructed from individual subholograms which are assigned to corresponding encoding regions in the light modulation device and which are respectively assigned to an object point of the object to be reconstructed with the hologram, wherein, with a virtual observer window, a defined viewing region is provided through which a reconstructed scene in a reconstruction space is observed by an observer, wherein a complex value of a wavefront for each individual object point is calculated in the virtual observer window and at least one value part of this complex value is corrected with a correction value and wherein the corrected complex values determined in this way for all object points are summed and transformed into the hologram plane of the light modulation device, in order to encode a hologram, wherein before the transformation of the summed complex value of all object points of the object to be reconstructed into the hologram plane, each individual amplitude of a complex value of a wavefront in the virtual observer window is multiplied by a correction value with which a correction of the angle selectivity of at least one volume grating arranged downstream in the beam path of the light modulation device is carried out, wherein the correction value is calculated from the root of the reciprocal value of the relative angle-dependent diffraction efficiency of the at least one volume grating.

2. The method as claimed in claim 1, wherein before the correction of a complex value of a wavefront in the virtual observer window, a ray bundle coming from a pixel of the light modulation device through the at least one volume grating to various positions within the virtual observer window is geometrically calculated, whereupon the incidence angle of a light ray of the ray bundle onto the at least one volume grating is respectively calculated, whereupon the diffraction efficiency of the at least one volume grating for the respective incidence angle is determined.

3. The method as claimed in claim 2, wherein a relative diffraction efficiency, which is used in order to determine the correction value, is obtained from the individual diffraction efficiency of one volume grating or from multiplication of the diffraction efficiencies of the individual volume gratings in the beam path for a light ray.

4. The method as claimed in claim 1, wherein if a plurality of volume gratings arranged downstream in the beam path of the light modulation device are provided, before the correction of a complex value of a wavefront in the virtual observer window, a ray bundle coming from a pixel of the light modulation device through the volume gratings to various positions within the virtual observer window is geometrically calculated, whereupon the incidence angles of light rays of the ray bundle coming from the pixel onto the individual volume gratings are respectively calculated, whereupon the diffraction efficiencies of the volume gratings for the respective incidence angles are determined, and whereupon the diffraction efficiencies of the individual volume gratings for the respective position of the light rays respectively incident on the volume gratings in the virtual observer window are multiplied.

5. The method as claimed in claim 1, wherein the correction values at the center of the virtual observer window, at the edge of the virtual observer window and for positions between the edge and the center of the virtual observer window have a magnitude in a value range of about 1.0 to ±2.0, wherein the individual correction magnitudes differ from one another.

6. The method as claimed in claim 5, wherein the correction of the angle selectivity of at least one volume grating is carried out in such a way that the determined amplitude of a complex value of a wavefront in the virtual observer window at the center of the virtual observer window is respectively multiplied by the assigned determined value, preferably about 1.02, at the edge of the virtual observer window by the assigned determined value, preferably about 1.06, and amplitudes respectively lying between these by an assigned determined value, preferably between about 1.02 and about 1.06.

7. The method as claimed in claim 1, wherein when at least one volume grating in the beam path having different diffraction efficiencies in different regions is used for correction of the angle selectivity of the volume grating a frustum spanned between the light modulation device and the virtual observer window is subdivided into at least two subfrustums, whereupon complex values of a wavefront in the virtual observer window are calculated separately for all object points of a 3D scene which lie in the respective subfrustum for each individual subfrustum, and whereupon correction values for each individual subfrustum are determined separately and whereupon the corrected complex values of the wavefront in the observer window of the individual subfrustums are summed and transformed into the hologram plane of the light modulation device, in order to encode a hologram.

8. The method as claimed in claim 1, wherein the same relative diffraction efficiency of at least one volume grating is obtained for all pixels of the light modulation device.

9. Apparatus for a holographic representation of two-dimensional and/or three-dimensional object scenes, comprising at least one light modulation device in which at least one hologram is encoded by the method according to claim 1.

10. A method for encoding at least one hologram in a light modulation device, the encoding of which is carried out pixelwise, wherein the hologram is constructed from individual subholograms which are assigned to corresponding encoding regions in the light modulation device and which are respectively assigned to an object point of the object to be reconstructed with the hologram, wherein, with a virtual observer window, a defined viewing region is provided through which a reconstructed scene in a reconstruction space is observed by an observer, wherein each object point of the object to be reconstructed is holographically encoded in a subhologram, wherein amplitudes of the subholograms are corrected with a correction value and the subholograms corrected in this way are summed in the hologram plane of the light modulation device, in order to encode a hologram, wherein each individual amplitude of each subhologram is corrected with a correction value with which a correction of the angle selectivity of at least one volume grating arranged downstream in the beam path of the light modulation device is carried out, wherein the correction value is calculated from the root of the reciprocal value of the relative angle-dependent diffraction efficiency of the at least one volume grating.

11. The method as claimed in claim 10, wherein, before the correction of the amplitudes of the sub-holograms, a ray bundle coming from a pixel of the light modulation device through the at least one volume grating to various positions within the virtual observer window is geometrically calculated, whereupon the incidence angle of a light ray of the ray bundle onto the at least one volume grating is respectively calculated, whereupon the diffraction efficiency of the at least one volume grating for the respective incidence angle is determined.

12. The method as claimed in claim 11, wherein a relative diffraction efficiency, which is used in order to determine the correction value, is obtained from the individual diffraction efficiency of one volume grating or from multiplication of the diffraction efficiencies of the individual volume gratings in the beam path for a light ray.

13. The method as claimed in claim 10, wherein, if a plurality of volume gratings arranged downstream in the beam path of the light modulation device are provided, before the correction of the amplitudes of the subholograms, a ray bundle coming from a pixel of the light modulation device through the volume gratings to various positions within the virtual observer window is geometrically calculated, whereupon the incidence angles of light rays of the ray bundle coming from the pixel onto the individual volume gratings are respectively calculated, whereupon the diffraction efficiencies of the volume gratings for the respective incidence angles are determined, and whereupon the diffraction efficiencies of the individual volume gratings for the respective position of the light rays respectively incident on the volume gratings in the virtual observer window are multiplied.

14. The method as claimed in claim 10, wherein the correction values at the center of the virtual observer window, at the edge of the virtual observer window and for positions between the edge and the center of the virtual observer window have a magnitude in a value range of about 1.0 to ±2.0, wherein the individual correction magnitudes differ from one another.

15. The method as claimed in claim 14, wherein the correction of the angle selectivity of at least one volume grating is carried out in such a way that an amplitude of a subhologram at the center of the subhologram is multiplied by the assigned determined value, preferably about 1.02, at the edge of the subhologram by the assigned determined value, preferably about 1.06, and amplitudes respectively lying between these by an assigned determined value, preferably between about 1.02 and about 1.06.

16. The method as claimed in claim 10, wherein the same relative diffraction efficiency of at least one volume grating is obtained for all pixels of the light modulation device.

17. The method as claimed in claim 10, wherein, when at least one volume grating in the beam path having different diffraction efficiencies in different regions is used, for correction of the angle selectivity of the volume grating a frustum spanned between the light modulation device and the virtual observer window is subdivided into at least two subfrustums, whereupon complex values of a wavefront in the virtual observer window are calculated separately for all object points of a 3D scene which lie in the respective subfrustum for each individual subfrustum, and whereupon correction values for each individual subfrustum are determined separately and whereupon the corrected complex values of the wavefront in the observer window of the individual subfrustums are summed and transformed into the hologram plane of the light modulation device, in order to encode a hologram.

18. Apparatus for a holographic representation of two-dimensional and/or three-dimensional object scenes, comprising at least one light modulation device in which at least one hologram is encoded by the method according to claim 10.

* * * * *